(12) United States Patent
Fuke

(10) Patent No.: US 8,718,724 B2
(45) Date of Patent: May 6, 2014

(54) PORTABLE COMMUNICATION TERMINAL

(75) Inventor: Masatake Fuke, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/094,162

(22) Filed: Apr. 26, 2011

(65) Prior Publication Data

US 2011/0261517 A1 Oct. 27, 2011

(30) Foreign Application Priority Data

Apr. 26, 2010 (JP) ................................ 2010-101536

(51) Int. Cl.
*H04M 1/00* (2006.01)

(52) U.S. Cl.
USPC ..................................................... 455/575.3

(58) Field of Classification Search
None
See application file for complete search history.

(56) References Cited

U.S. PATENT DOCUMENTS

| 7,107,083 | B2 * | 9/2006 | Watanabe | 455/575.3 |
| 7,158,083 | B2 * | 1/2007 | Satoh et al. | 343/702 |
| 7,283,853 | B2 * | 10/2007 | Kanazawa et al. | 455/575.1 |
| 7,336,782 | B2 * | 2/2008 | Watanabe et al. | 379/433.13 |
| 8,280,463 | B2 * | 10/2012 | Hori et al. | 455/575.3 |
| 2001/0034242 | A1 * | 10/2001 | Takagi | 455/550 |
| 2004/0253977 | A1 * | 12/2004 | Matsumoto et al. | 455/550.1 |
| 2005/0079903 | A1 * | 4/2005 | Taketomi et al. | 455/575.5 |
| 2005/0107118 | A1 * | 5/2005 | Makino | 455/556.1 |
| 2005/0119023 | A1 * | 6/2005 | Sudo et al. | 455/550.1 |
| 2007/0021159 | A1 * | 1/2007 | Kaneoya | 455/575.3 |
| 2008/0081679 | A1 * | 4/2008 | Kawasaki et al. | 455/575.8 |
| 2008/0300028 | A1 * | 12/2008 | Uejima et al. | 455/575.3 |
| 2009/0061967 | A1 * | 3/2009 | Matsuda | 455/575.7 |
| 2009/0082073 | A1 * | 3/2009 | Hori et al. | 455/575.3 |
| 2009/0131129 | A1 * | 5/2009 | Yamazaki et al. | 455/575.7 |

FOREIGN PATENT DOCUMENTS

| JP | 2006-050056 | 2/2006 |
| JP | 2006-050324 | 2/2006 |
| JP | 2009-177845 | 8/2009 |
| JP | 2010-035045 | 2/2010 |

OTHER PUBLICATIONS

Notification of Reasons for Rejection in corresponding Japanese Official Action No. 2010-101536 dated Oct. 15, 2013

* cited by examiner

*Primary Examiner* — Jinhee Lee
*Assistant Examiner* — Xanthia C Cunningham
(74) *Attorney, Agent, or Firm* — Scully, Scott, Murphy & Presser PC

(57) ABSTRACT

A portable communication terminal includes a metal plate at least partially covered by a resin, a display-side casing that retains the metal plate thereinside with a part of the metal plate covered by the resin being exposed to the exterior, an elastic member with conductivity that is arranged in an opening formed in the resin which covers the part of the metal plate exposed from the display-side casing, and a communication unit that is electrically connected to the metal plate through the elastic member. Hence, the metal plate and the communication unit are electrically connected together, and the space between the metal plate and the resin is blocked off by the elastic member. Accordingly, the waterproofing property of the interior of the display-side casing can be ensured.

7 Claims, 8 Drawing Sheets

PORTABLE COMMUNICATION TERMINAL

INCORPORATION BY REFERENCE

This application is based on Japanese Patent Application No. 2010-101536 filed on Apr. 26, 2010 and including specification, claims, drawings and summary. The disclosure of the above Japanese Patent Application is incorporated herein by reference in its entirety.

TECHNICAL FIELD

The present invention relates to a portable communication terminal.

BACKGROUND ART

Recently, from the standpoint of securing the portability, portable communication terminals like cellular phones widely employ a two-piece structure having the casing divided into an operating-side casing and a display-side casing. Such kind of portable communication terminals have a metal plate that is used as an antenna element arranged in the display-side casing as disclosed in, for example, Unexamined Japanese Patent Application KOKAI Publication No. 2006-50056 and Unexamined Japanese Patent Application KOKAI Publication No. 2006-50324.

The metal plate retained in the display-side casing is electrically connected to an electronic unit retained in the operating-side casing. Hence, it is preferable that a part of the metal plate should be exposed from the display-side casing. However, it is expected that moisture enters into the display-side casing through a space between the metal plate and the casing or a space between the metal plate and a resin coating such metal plate if the part of the metal plate is exposed.

In order to cope with such a problem, a thermosetting bonding film is pasted on the surface of the metal plate in order to block-off such a space. In this case, however, the cost increases and the yield decreases.

SUMMARY

The present invention has been made under such a circumstance, and it is an exemplary object of the present invention to suppress a cost increase of a product and ensure the waterproofing property of a casing.

In order to accomplish the above exemplary object, a first exemplary aspect of the present invention provides a portable communication terminal that includes:

a conductive body at least partially covered by a resin;
a first casing that retains the conductive body thereinside with a part of the conductive body covered by the resin being exposed to an exterior;
an elastic member with conductivity that is arranged in an opening formed in the resin which covers the part of the conductive body exposed from the first casing; and
a communication unit that is electrically connected to the conductive body through the elastic member.

In order to accomplish the above exemplary object, a second aspect of the present invention provides a portable communication terminal that includes:

a conductive means at least partially covered by a resin;
a first casing means for retaining the conductive means thereinside with a part of the conductive means covered by the resin being exposed to an exterior;
an elastic means with conductivity that is arranged in an opening formed in the resin which covers the part of the conductive means exposed from the first casing means; and
a communication means that is electrically connected to the conductive means through the elastic means.

BRIEF DESCRIPTION OF THE DRAWINGS

The exemplary object and other objects and advantages of the present invention will become more apparent upon reading of the following detailed description and the accompanying drawings in which.

EXEMPLARY EMBODIMENTS

<<First Exemplary Embodiment>>

An explanation will be given of a first exemplary embodiment with reference to FIGS. 1 to 6.

Figure 1:
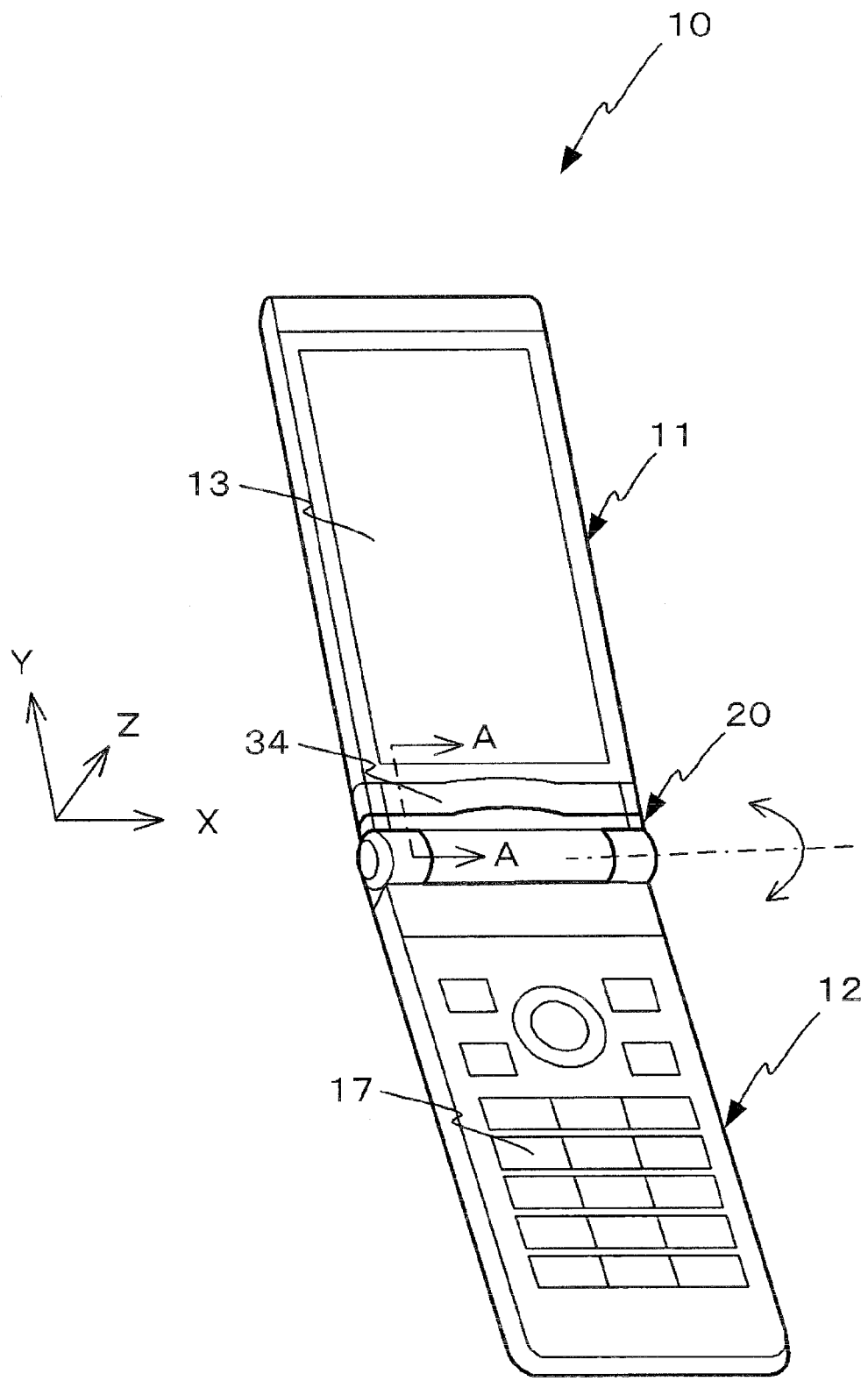
FIG. 1 is a perspective view showing an opened cellular phone according to a first embodiment of the present invention.

FIG. 1 is a perspective view showing an opened cellular phone 10 according to a first embodiment. The cellular phone 10 is a foldable cellular phone which is closed (in a closed condition) when carried, and is opened (in an opened condition) at the time of calling, etc. The cellular phone 10 includes a display-side casing 11, an operating-side casing 12, a hinge 20 that joins the display-side casing 11 and the operating-side casing 12, and a cover 34 that partially covers the hinge 20. In the following explanation, the axial direction of the hinge 20 is referred to as an "X axis direction", the lengthwise direction of the cellular phone 10 is referred to as a "Y axis direction", and the vertical direction to the display surface of the display-side casing 11 is referred to as a "Z axis direction".

Figure 2:
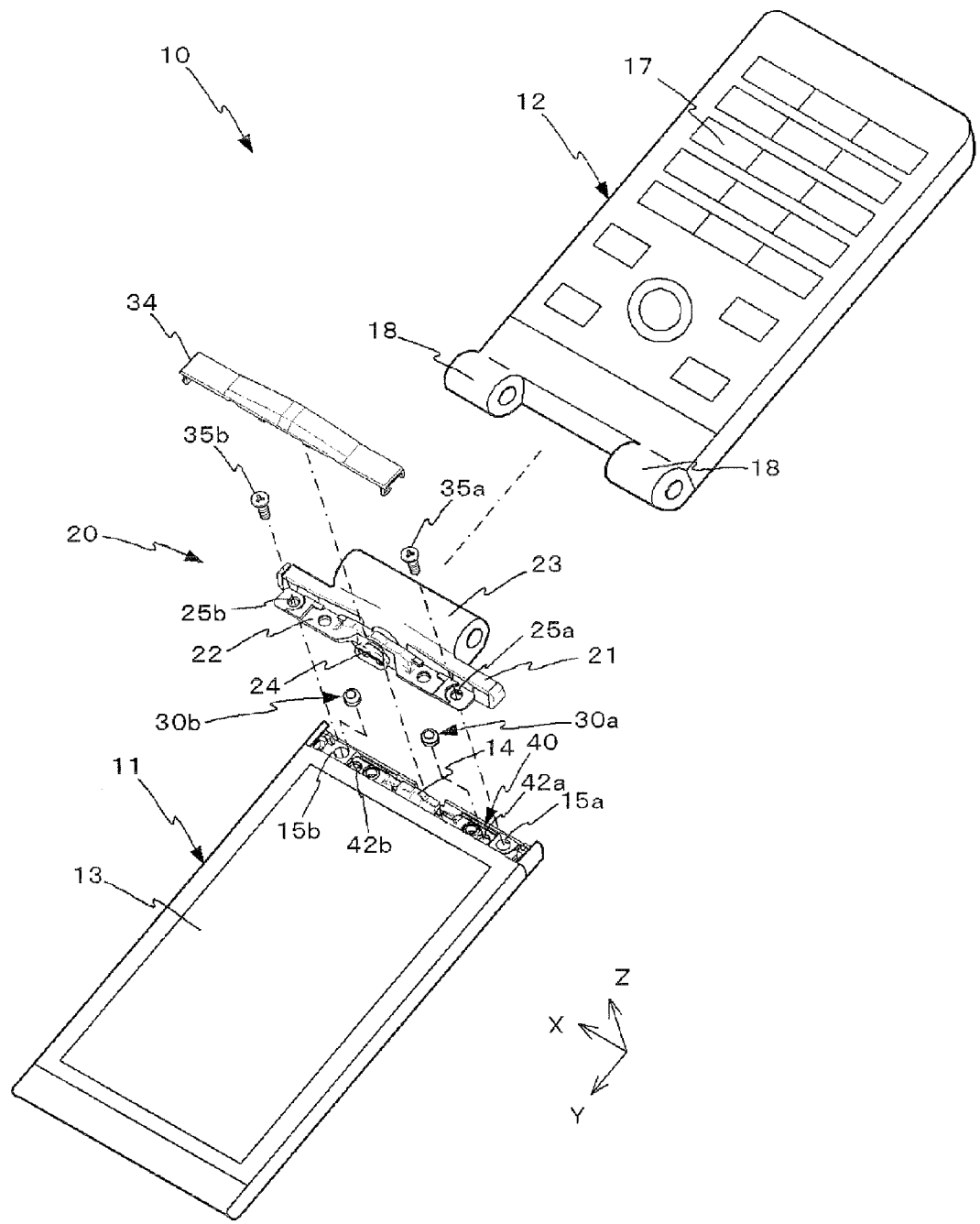
FIG. 2 is an exploded perspective view of the cellular phone.

FIG. 2 is an exploded perspective view of the cellular phone 10. As shown in FIG. 2, the display-side casing 11 is a casing in a cuboidal shape formed by resin, for example, ABS resin (acrylonitrile butadiene styrene resin), PC resin (polycarbonate resin), and Reny resin. Retained in the display-side casing 11 are a liquid crystal unit comprising a liquid crystal panel 13, etc., and a tabular member 40 comprising a metal plate 41 and a resin 42, and the like. An end of the tabular member 40 at the hinge-20 side (−Y side) is exposed from the display-side casing 11. The liquid crystal panel 13 is provided in such a manner as to be viewable from the operating-side-casing-12 side (+Z side) when the cellular phone 10 is closed, and displays information, such as an image, a figure, a character, and a symbol.

Figure 3A:
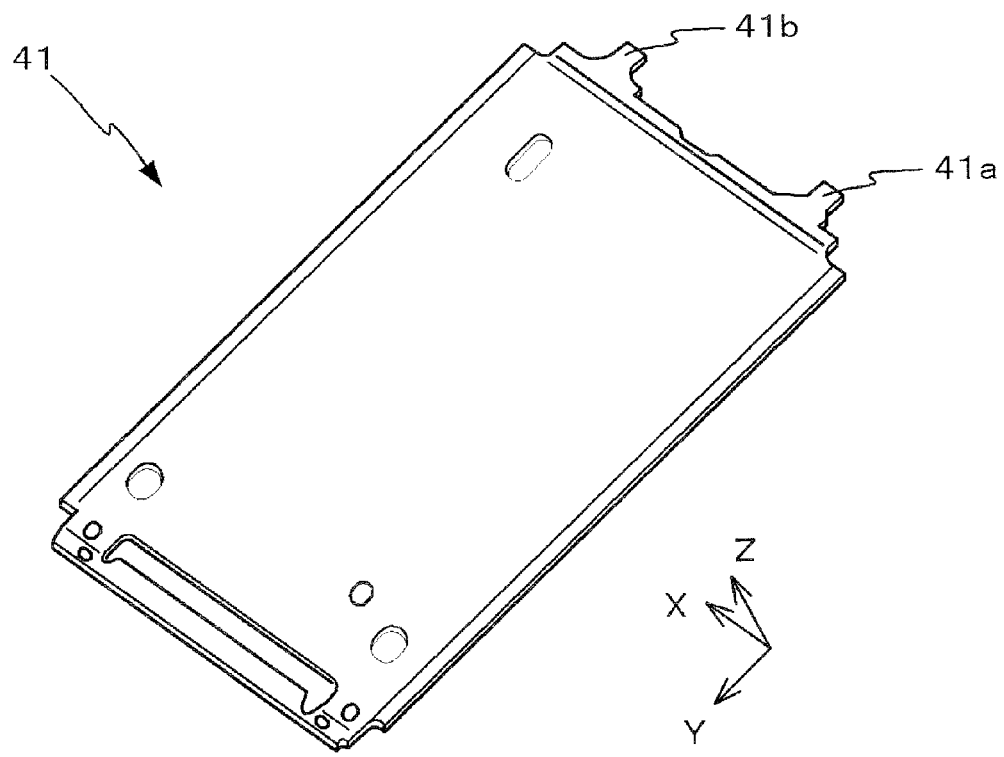
FIG. 3A is a perspective view showing a metal plate.

FIG. 3A is a perspective view showing the metal plate 41. The metal plate 41 comprises a material like stainless steel.

Figure 3B:
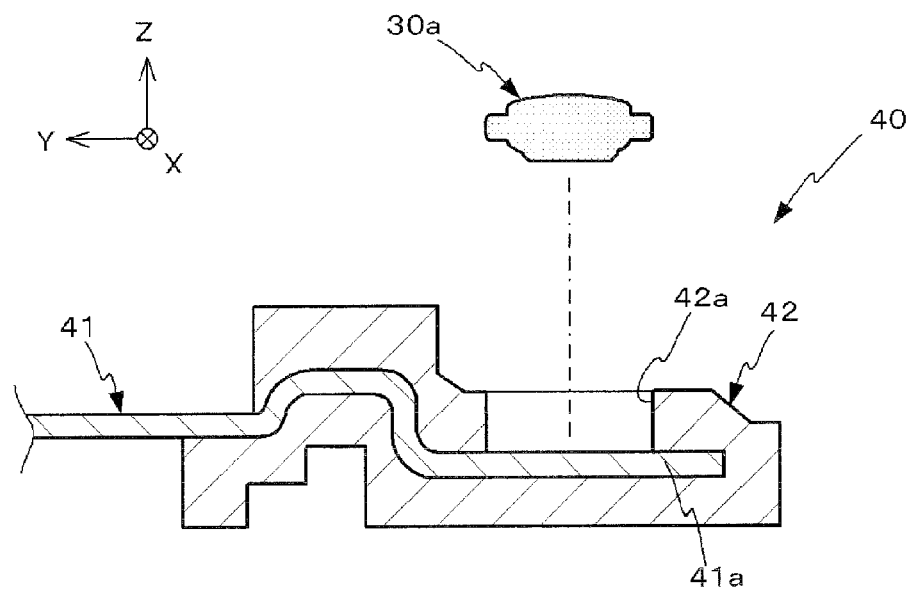
FIG. 3B is a cross-sectional view showing a protruding portion of the metal plate.

As shown in FIG. 3A, the metal plate 41 has protruding portions 41a and 41b at −Y side protruding thereto. FIG. 3B is a cross-sectional view of the protruding portion 41a of the metal plate 41 as viewed from the X axis direction. As shown in FIG. 3B, the protruding portion 41a is covered by the resin 42. The resin 42 is formed by a material which is similar to that of the display-side casing 11. The resin 42 has an opening 42a where an elastic member 30a is pressed-in. The opening 42a is formed in the Z axis direction, and is formed in a circular shape. The protruding portion 41a is exposed from the resin 42 through the opening 42a.

The protruding portion 41b is covered by the resin 42 like the protruding portion 41a. The resin 42 has an opening 42b where an elastic member 30b is pressed-in. The opening 42b is formed in the Z axis direction, and is formed in a circular shape. The protruding portion 41b is exposed from the resin 42 through the opening 42b.

As shown in FIG. 2, formed at an end of the display-side casing 11 at −Y side are a connector 14 electrically connected to the liquid crystal unit retained in the display-side casing 11 and screw holes 15a and 15b.

The operating-side casing 12 is a casing in substantially same cuboidal shape as that of the display-side casing 11. Hinge parts 18 protruding in the +Y direction are formed at an end of the operating-side casing 12 at the hinge-20 side (+Y side). An opening passing all the way through the hinge part 18 in the X axis direction is formed in the hinge part 18. The operating-side casing 12 has plural operating keys 17 arranged on a surface at the display-side-casing-11 side (+Z side) when the cellular phone 10 is closed. Retained in the operating-side casing 12 are, for example, an electronic unit including a circuit detecting an input through the operating key 17 and controlling the liquid crystal unit, and a communication unit for inputting of a signal from a commercial cellular phone communication network and for outputting a signal thereto.

The hinge 20 is a member for joining the display-side casing 11 and the operating-side casing 12. The hinge 20 includes a hinge main body 21, a hinge plate 22 formed at the +Y side of the hinge main body 21, and a hinge cylinder 23 formed at the −Y side of the hinge main body 21.

The hinge plate 22 is formed so as to be rotatable around the Y axis relative to the hinge main body 21. The hinge plate 22 is formed of a member with conductivity. Moreover, a connector 24 is formed at the center of the hinge plate 22, and openings 25a and 25b passing all the way through the hinge plate 22 in the Z axis direction are formed in both ends of the hinge plate 22 in the X axis direction.

The hinge cylinder 23 is formed together with the hinge main body 21. An opening passing all the way through the hinge cylinder 23 in the X axis direction is formed in the hinge cylinder 23.

A non-illustrated cable is arranged inside the hinge 20. The cable comprises, for example, plural coaxial cables bundled as one and covered by a waterproof tube. The coaxial cables have respective one ends electrically connected to the connector 24 and the hinge plate 22. The coaxial cables also have respective another ends pulled out from an opening formed in the hinge cylinder 23.

Figure 4:
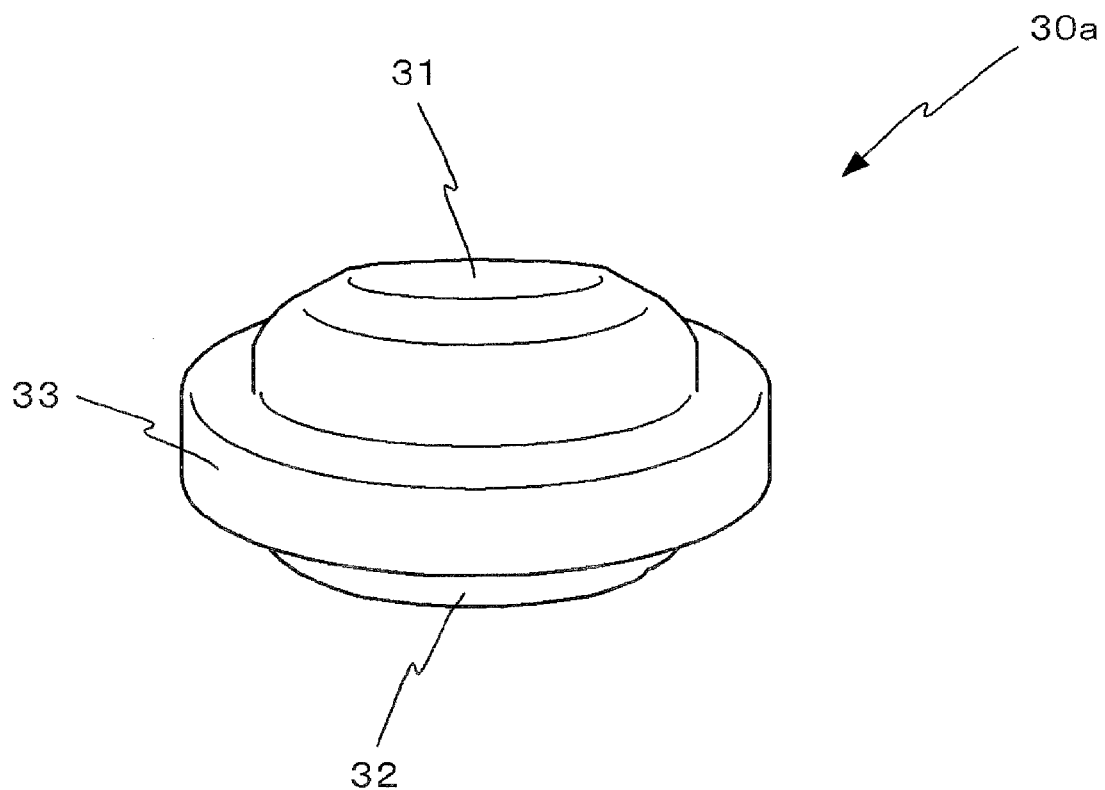
FIG. 4 is a perspective view showing an elastic member.
Figure 4:
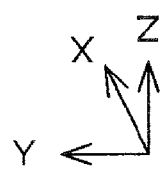

As shown in FIG. 4, the elastic member 30a is formed in substantially discoidal shape. The elastic member 30a comprises a material with conductivity like a conductive silicon rubber. The elastic member 30a has ends 31 and 32 protruding up and down, and a flange 33 protruding in a radial direction. The elastic member 30b has the same shape and material as those of the elastic member 30a.

The above-explained display-side casing 11 and operating-side casing 12 are joined together as follow. As shown in FIG. 2, first, the elastic members 30a and 30b are pressed in respective openings 42a and 42b formed in the resin 42 covering the protruding portions 41a and 41b. Next, the ends of the coaxial cables are connected to the electronic unit and the communication unit retained inside the operating-side casing 12. Thereafter, the connector 24 of the hinge 20 is connected to the connector 14 of the display-side casing 11. Accordingly, the liquid crystal unit arranged inside the display-side casing 11 and the electronic unit arranged inside the operating-side casing 12 are electrically connected together through the coaxial cables.

Next, screws 35a and 35b are inserted in the screw holes 15a and 15b of the display-side casing 11, respectively, through the openings 25a and 25b of the hinge plate 22, thereby fastening the display-side casing 11 and the hinge 20. Next, the cover 34 is fixed to the hinge 20 from +Z side so that the hinge plate 22 is not exposed to the exterior.

Finally, non-illustrated shaft members are inserted into the openings of the hinge cylinder 23 through respective openings of the hinge parts 18 from −X side and from +X side. Accordingly, the hinge 20 and the operating-side casing 12 are joined together in a rotatable manner.

Figure 5:
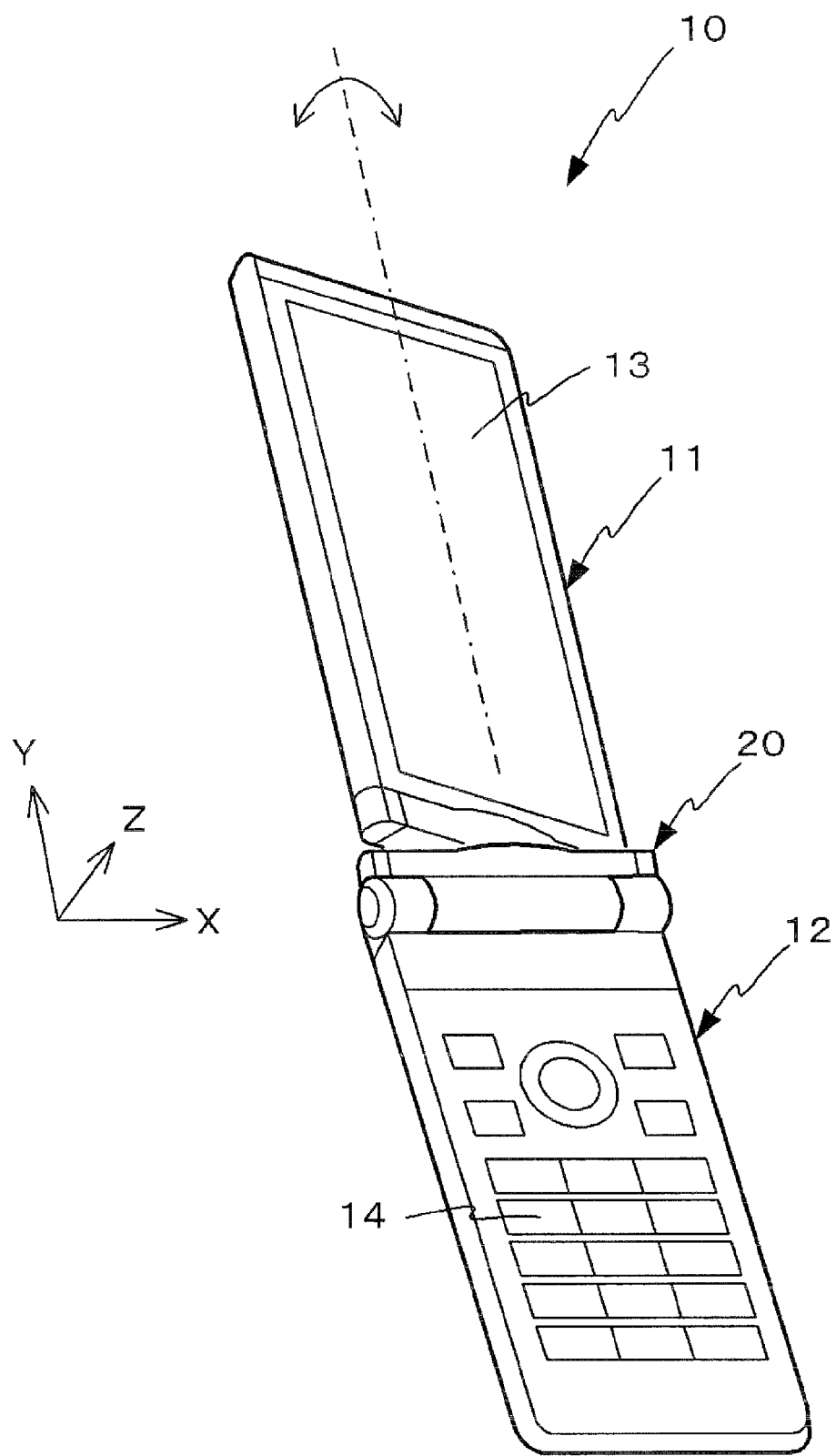
FIG. 5 is a perspective view for explaining a rotation of a display-side casing.

The cellular phone 10 employing the above-explained configuration allows, as shown in FIG. 1, the display-side casing 11 and the operating-side casing 12 to rotate relative to each other around the X axis, thereby changing a condition between the closed condition and the opened condition. Moreover, as shown in FIG. 5, in the opened condition, the display-side casing 11 can be rotated around the Y axis.

Figure 6:
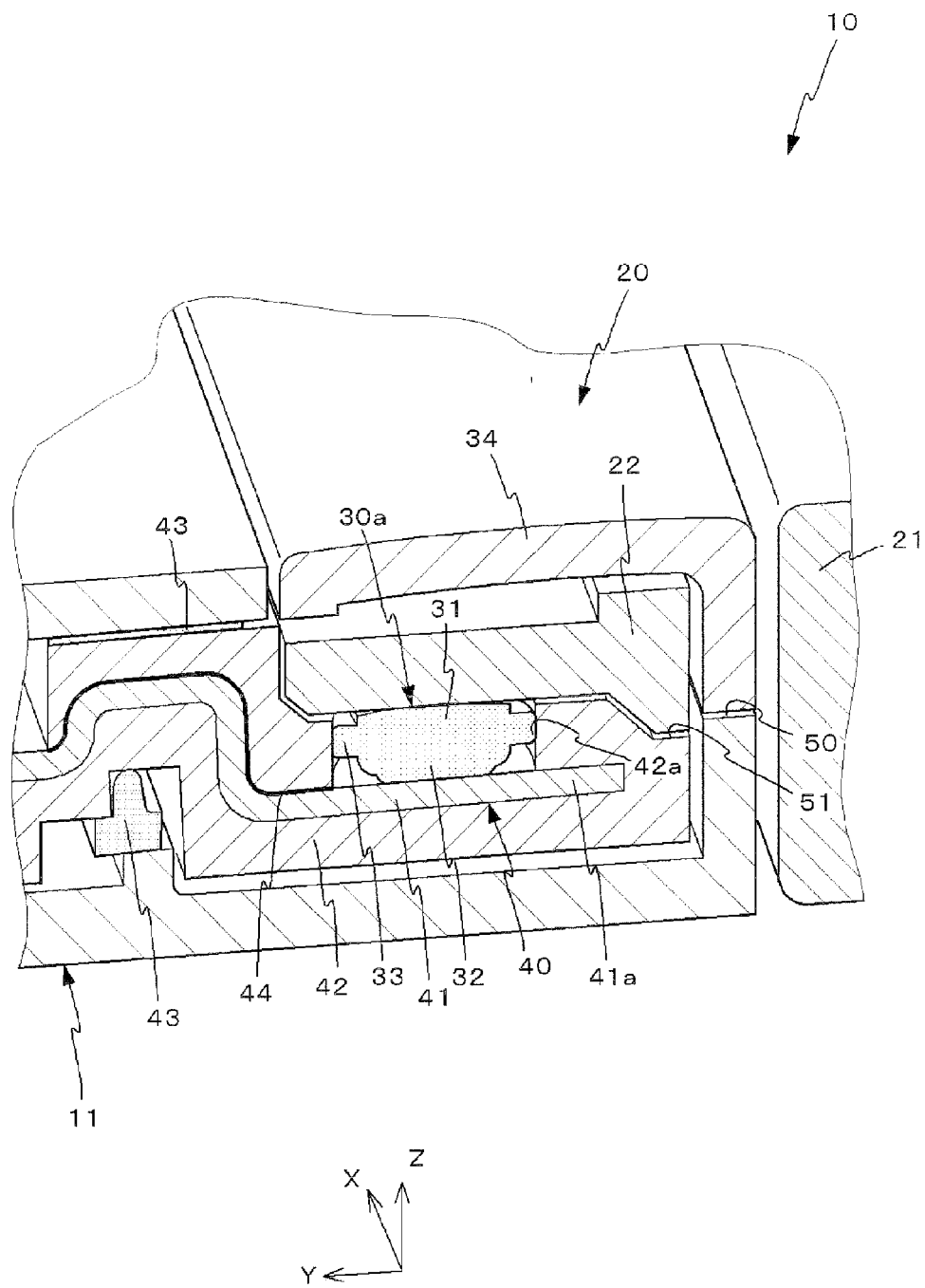
FIG. 6 is a perspective view showing a cross-section of the cellular phone along A-A line as shown in FIG. 1.

FIG. 6 is a perspective view showing a cross-section of the cellular phone 10 along a line A-A in FIG. 1. As shown in FIG. 6, the elastic member 30a is inserted in the opening 42a of the resin 42, the flange 33 contacts the internal wall of the opening 42a, the end 31 at the +Z side contacts the hinge plate 22, and the end 32 at the −Z side contacts the protruding portion 41a of the metal plate 41. Likewise, the elastic member 30b is inserted in the opening 42b of the resin 42, the flange 33 contacts the internal wall of the opening 42b, the end at the +Z side contacts the hinge plate 22, and the end at the −Z side contacts the protruding portion 41b of the metal plate 41. Because the elastic members 30a and 30b are pressed in respective openings 42a and 42b of the resin 42, forces expanding to the exterior are produced, and the elastic members 30a and 30b elastically contact the resin 42, the hinge plate 22, and the metal plate 41. Because the elastic members 30a and 30b are formed of a material with conductivity, the metal plate 41 and the hinge plate 22 are electrically connected together through the elastic members 30a and 30b. Hence, the metal plate 41 is electrically connected to the communication unit through the elastic members 30a and 30b, the hinge plate 22, and the coaxial cables. The metal plate 41 is used as an antenna element.

Moreover, a space 50 is formed between the end of the display-side casing 11 at the −Y side and the end of the cover 34 at −Y side. Furthermore, a space 51 is formed between the end of the resin 42 at −Y side and the end of the hinge plate 22 at −Y side. Hence, the openings 42a and 42b are communicated with the exterior through the spaces 50 and 51.

As explained above, according to the cellular phone 10 of the first exemplary embodiment, the metal plate 41 and the communication unit are electrically connected together through the elastic members 30a and 30b, and a space 44 between the metal plate 41 and the resin 42 is blocked off by the elastic member 30a and 30b elastically contacting respective openings 42a and 42b of the resin 42. Accordingly, it is possible to ensure the waterproofing property on the interior of the display-side casing 11 while letting the metal plate 41 being exposed from the display-side casing 11. More specifically, moisture passing through the spaces 50 and 51 enters into the openings 42a and 42b, but is not allowed to enter into the space 44 between the metal plate 41 and the resin 42 because of the elastic members 30a and 30b. Hence, it is not necessary to apply a waterproofing treatment between the metal plate 41 and the resin 42, so that the cost increase of the product can be suppressed.

<<Second Exemplary Embodiment>>

Next, a second exemplary embodiment of the present invention will be explained with reference to FIGS. 7 and 8. The same structural element as that of the first embodiment will be denoted by the same reference numeral, and the duplicated explanation thereof will be omitted or simplified.

Figure 7:
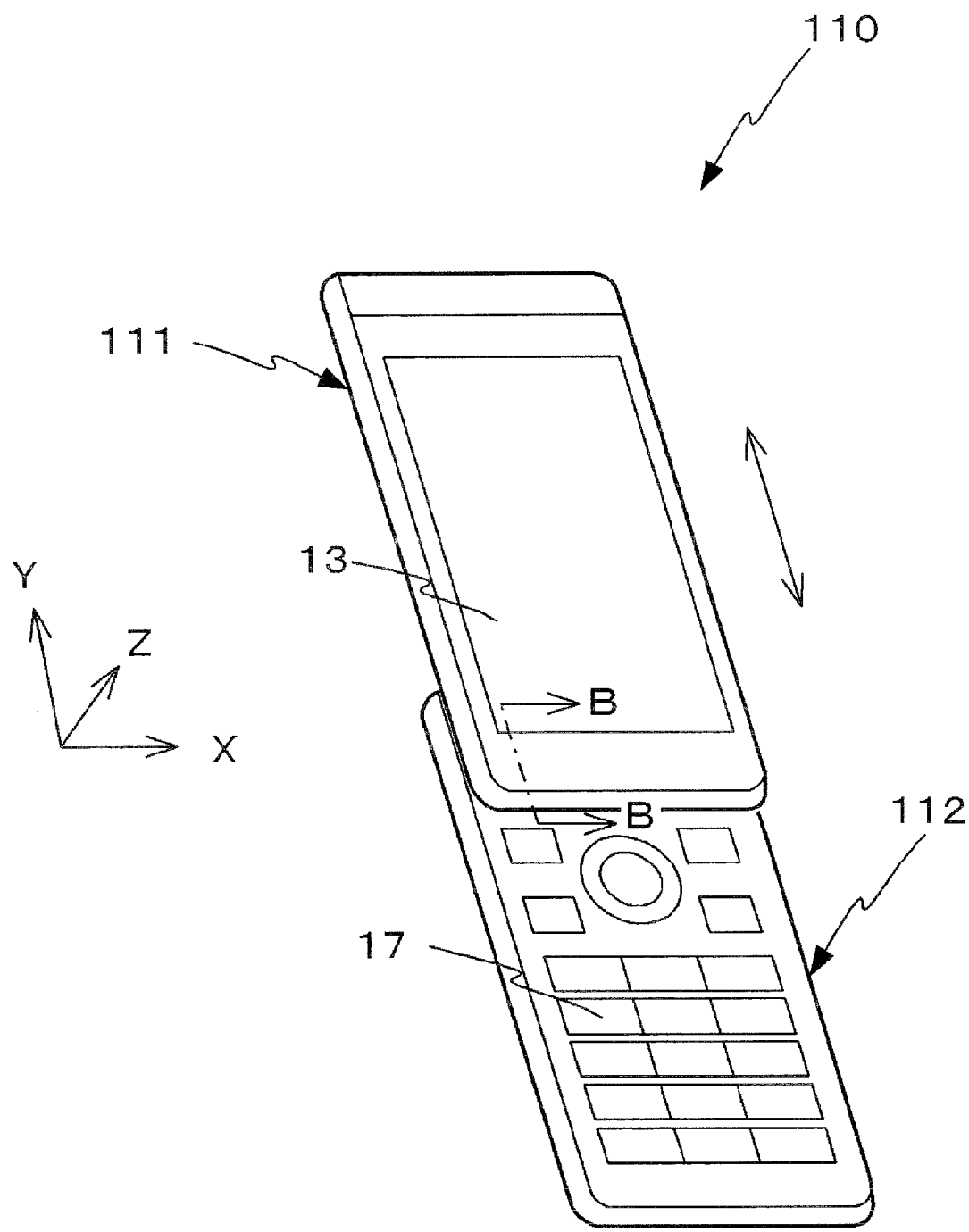
FIG. 7 is a perspective view showing an opened cellular phone according to a second embodiment of the present invention.

FIG. 7 is a perspective view of a cellular phone 110 according to the second embodiment of the present invention. As shown in FIG. 7, the cellular phone 110 is a slidable cellular phone that can change a condition between a closed condition in which a display-side casing 111 and an operating-side casing 112 overlap and an opened condition in which the operating keys 17 are exposed by sliding the display-side casing 111 relative to the operating-side casing 112.

Figure 8:
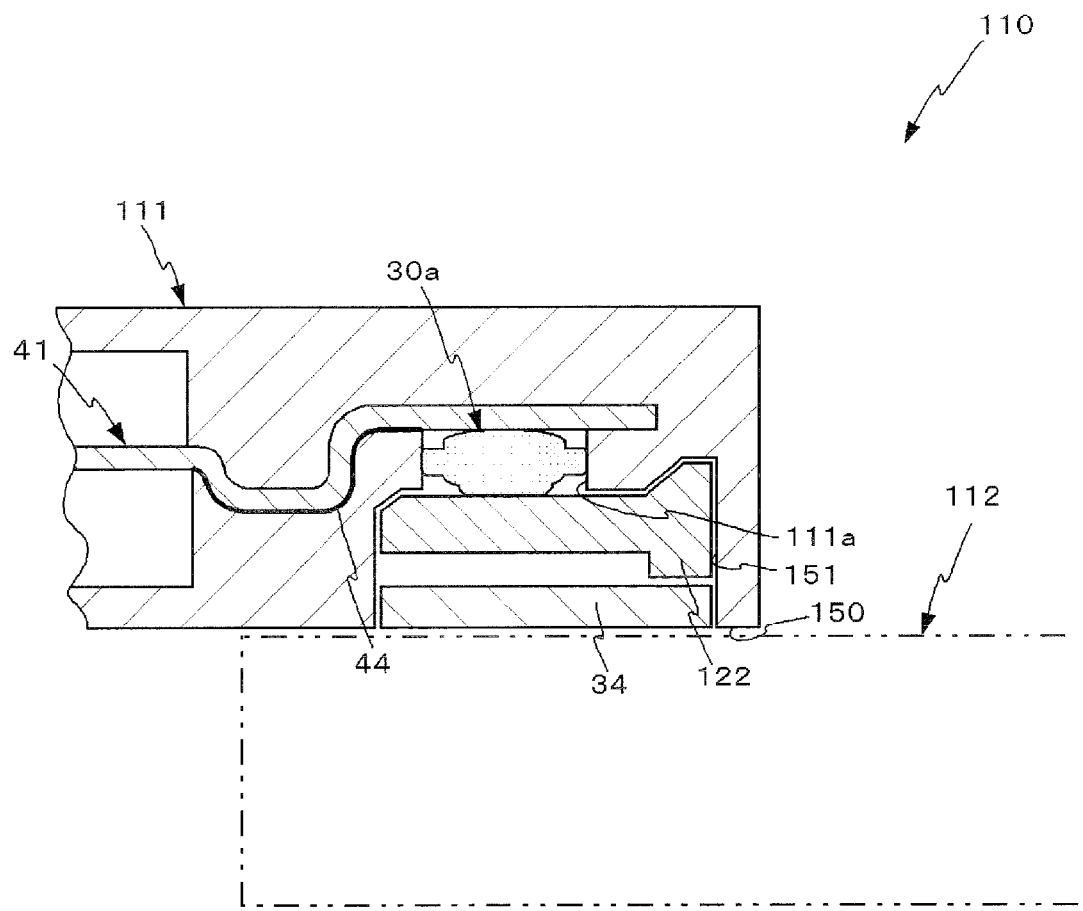
FIG. 8 is a cross-sectional view of the cellular phone along a line B-B as shown in FIG. 7.
Figure 8:
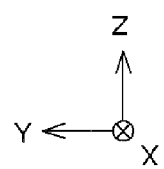

FIG. 8 is a cross-sectional view of the cellular phone 110 along a line B-B in FIG. 7. Retained in the display-side casing 111 are a liquid crystal unit comprising the liquid crystal panel 13, etc., and the metal plate 41 (see FIG. 3A). The metal plate 41 is exposed from an opening 111a formed in the display-side casing 111. The elastic member 30a is pressed in the opening 111a.

A space 150 is formed at a connected portion between the display-side casing 111 and the operating-side casing 112. Moreover, a space 151 is formed between the display-side casing 111 and a plate 122 formed of a conductive material. Hence, the opening 111a is communicated with the exterior through the spaces 150 and 151.

The plate 122 is electrically connected to the communication unit arranged inside the operating-side casing 112 through coaxial cables. Accordingly, the metal plate 41 is electrically connected to the communication unit through the elastic member 30a, the plate 122, and the coaxial cables.

As explained above, according to the cellular phone 110 of the second exemplary embodiment, like the cellular phone 10 of the first exemplary embodiment, the metal plate 41 and the communication unit are electrically connected together through the elastic member 30a, and the space 44 between the metal plate 41 and the display-side casing 111 is blocked off by the elastic member 30a and 30b elastically contacting the opening 111a of the display-side casing 111. Accordingly, it is possible to ensure the waterproofing property on the interior of the display-side casing 111 while letting the metal plate 41 being exposed from the display-side casing 111. More specifically, moisture passing through the spaces 150 and 151 enters into the opening 111a, but is not allowed to enter into the space 44 between the metal plate 41 and the display-side casing 111 because of the elastic member 30a. Hence, it is not necessary to apply a waterproofing treatment between the metal plate 41 and the display-side casing 111, so that the cost increase of the product can be suppressed.

The first and second exemplary embodiments were explained above, but the present invention is not limited to the above-explained exemplary embodiments.

The material of the elastic members 30a and 30b is a silicon rubber with conductivity in the foregoing exemplary embodiments, but is not limited to this, and can be other elastic materials with conductivity.

The substantially discoidal elastic members 30a and 30b each having the ends 31 and 32 and the flange 33 are pressed in the circular openings 42a, 42b, and 111a in the foregoing exemplary embodiments, but the elastic member and the opening may be in other shapes such that substantially cuboidal elastic member is pressed in a substantially rectangular opening. Moreover, the elastic members 30a and 30b are pressed in the openings 42a, 42b, and 111a in the foregoing exemplary embodiments, but the present invention is not limited to this configuration. For example, a liquid resin with conductivity may be filled in an opening and may be cured.

The cellular phones 10 and 110 have two or one elastic member in the foregoing exemplary embodiments, but the number of elastic members is not limited to such numbers, and equal to or larger than three elastic members may be used.

The material of the metal plate 41 is stainless steel in the foregoing exemplary embodiments, but is not limited to stainless steel, and may be other materials with conductivity.

The cellular phones 10 and 110 are foldable and slidable in the foregoing exemplary embodiments, but the present invention is not limited to this configuration, and for example, the cellular phone may be a revolver type.

The coaxial cables are used for connecting the liquid crystal unit retained inside the display-side casing 11 or 111 and the electronic unit retained inside the operating-side casing 12 or 112 in the forgoing exemplary embodiments. The present invention is not limited to this configuration, and for example, a flexible printed substrate may be used.

The present invention is not limited to the cellular phone explained in the foregoing exemplary embodiments, but can be applied to portable communication terminals, such as a PDA (Personal Digital Assistant), a PHS (Personal Handyphone System), a laptop, a wearable computer, a calculator, an electronic dictionary, an electronic gaming machine, and other information processing devices.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

The whole or part of the exemplary embodiments disclosed above can be described as, but not limited to, the following supplementary notes.

(Supplementary note 1) A portable communication terminal comprising:
 a conductive body at least partially covered by a resin;
 a first casing that retains the conductive body thereinside with a part of the conductive body covered by the resin being exposed to an exterior;
 an elastic member with conductivity that is arranged in an opening formed in the resin which covers the part of the conductive body exposed from the first casing; and
 a communication unit that is electrically connected to the conductive body through the elastic member.

(Supplementary note 2) The portable communication terminal according to Supplementary note 1, further comprising a second casing that retains the communication unit thereinside.

(Supplementary note 3) The portable communication terminal according to Supplementary note 2, wherein the second casing is rotatable relative to the first casing.

(Supplementary note 4) The portable communication terminal according to Supplementary note 2, wherein the second casing is slidable relative to the first easing.

(Supplementary note 5) The portable communication terminal according to Supplementary notes 1 to 4, wherein the elastic member is a silicon rubber with conductivity.

(Supplementary note 6) The portable communication terminal according to Supplementary notes 1 to 5, wherein the resin configures the fist casing.

(Supplementary note 7) A portable communication terminal comprising:
  a conductive means at least partially covered by a resin;
  a first casing means for retaining the conductive means thereinside with a part of the conductive means covered by the resin being exposed to an exterior;
  an elastic means with conductivity that is arranged in an opening formed in the resin which covers the part of the conductive means exposed from the first casing means; and
  a communication means that is electrically connected to the conductive means through he elastic means.

What is claimed is:

1. A portable communication terminal comprising:
  a conductive body at least partially covered by a resin;
  a first casing that retains the conductive body thereinside with a part of the conductive body covered by the resin being exposed to an exterior of the first casing;
  an elastic member with conductivity that is arranged in an opening formed in the resin which covers the part of the conductive body exposed to the exterior of the first casing, the elastic member blocking off the opening to electrically connect to the conductive body by elastically contacting a side wall of the opening and the conductive body exposed to the opening; and
  a communication unit that is electrically connected to the conductive body through the elastic member.

2. The portable communication terminal according to claim 1, further comprising a second casing that retains the communication unit thereinside.

3. The portable communication terminal according to claim 2, wherein the second casing is rotatable relative to the first casing.

4. The portable communication terminal according to claim 2, wherein the second casing is slidable relative to the first casing.

5. The portable communication terminal according to claim 1, wherein the elastic member is a silicon rubber with conductivity.

6. The portable communication terminal according to claim 1, wherein the resin configures the first casing.

7. A portable communication terminal comprising:
  a conductive means at least partially covered by a resin;
  a first casing means for retaining the conductive means thereinside with a part of the conductive means covered by the resin being exposed to an exterior of the first casing means;
  an elastic means with conductivity that is arranged in an opening formed in the resin which covers the part of the conductive means exposed to the first casing means, the elastic means blocking off the opening to electrically connect to the conductive means by elastically contacting a side wall of the opening and the conductive means exposed to the opening; and
  a communication means that is electrically connected to the conductive means through the elastic means.

* * * * *